United States Patent Office 2,844,101
Patented July 22, 1958

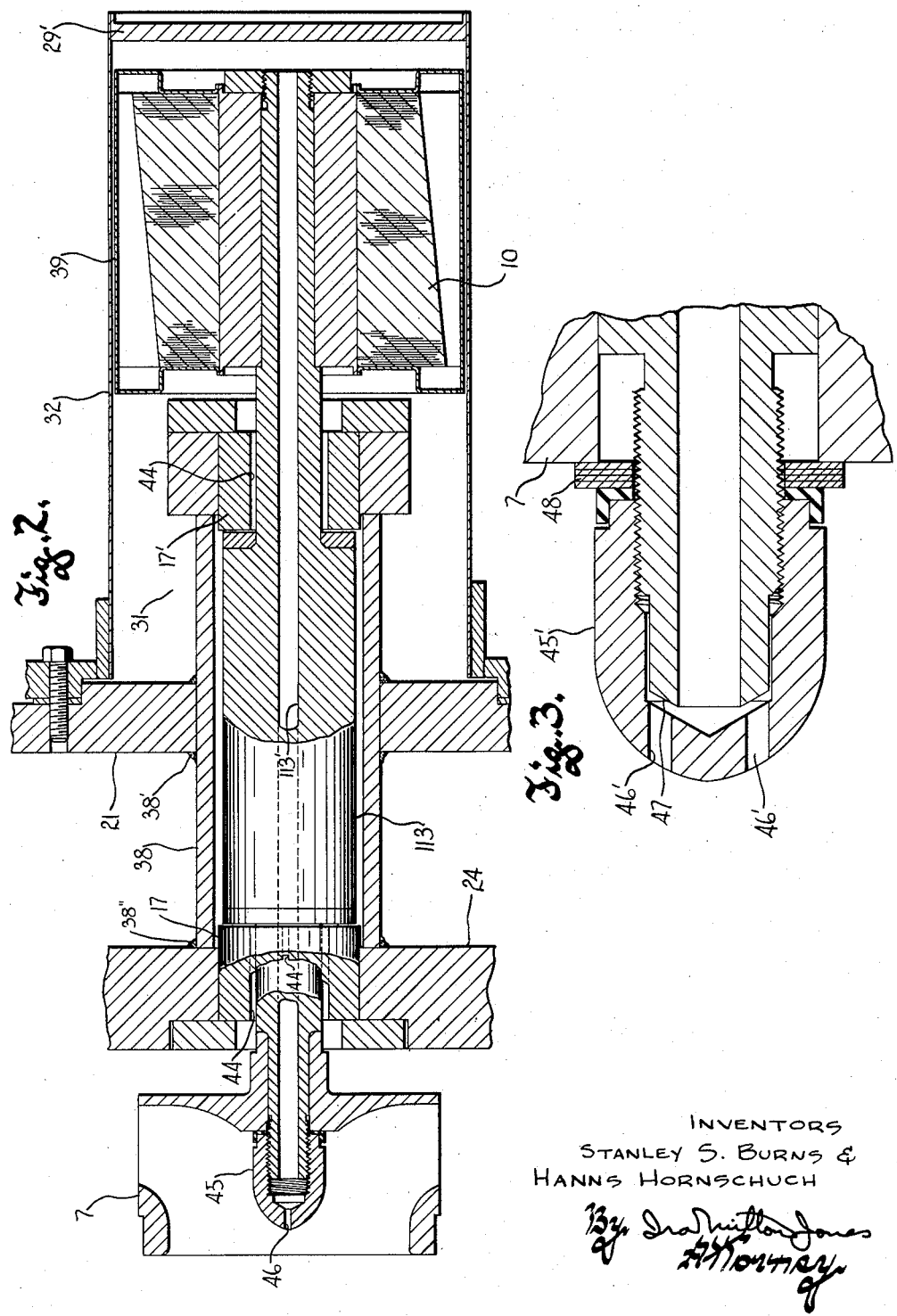

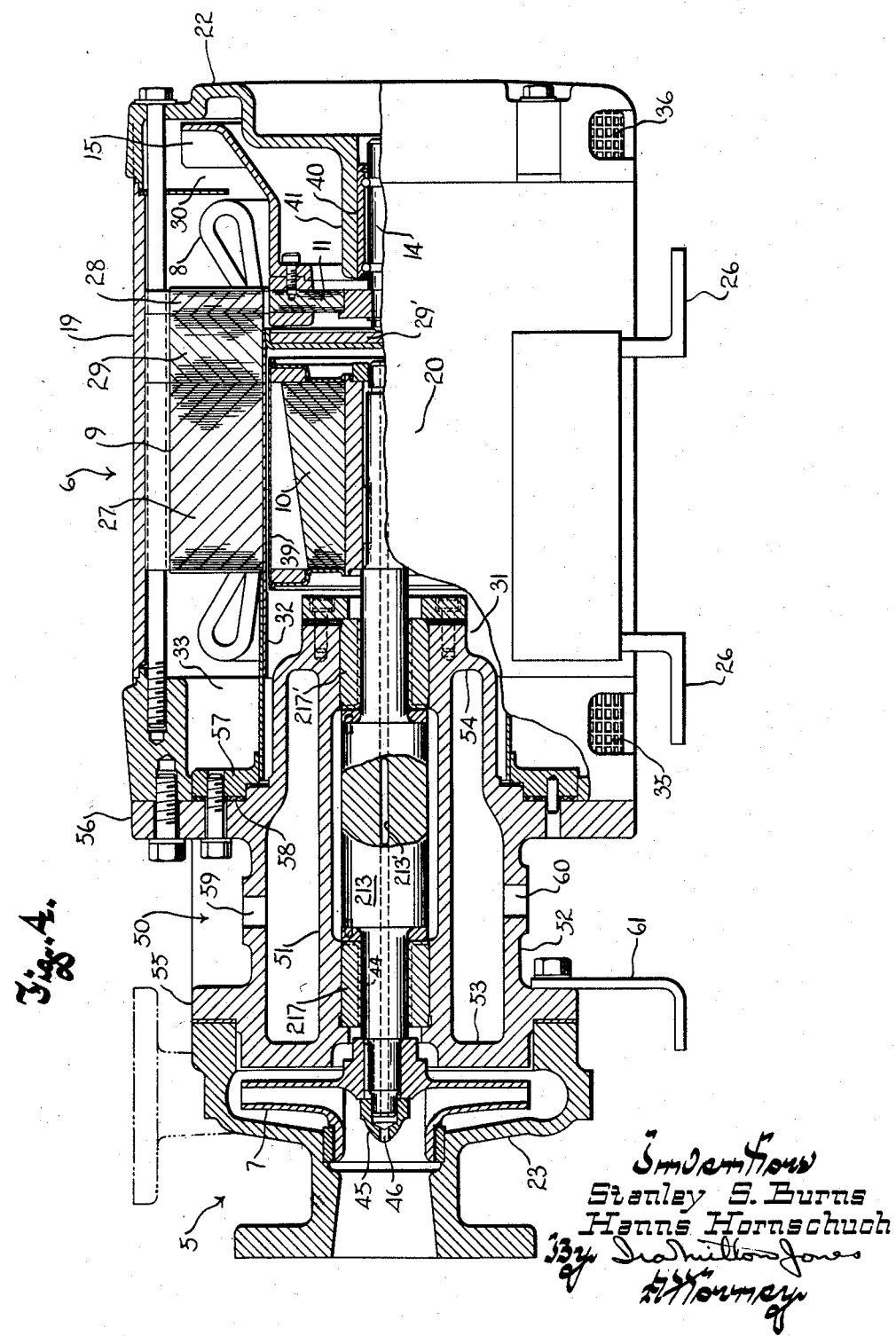

2,844,101

GLANDLESS ELECTRIC MOTOR AND PUMP UNIT

Stanley S. Burns, Wausau, Wis., and Hanns Hornschuch, Easton, Pa., assignors of fifty percent to Marathon Electric Manufacturing Corporation, a corporation of Wisconsin, and fifty percent to Ingersoll-Rand, a corporation of New Jersey Application September 18, 1957, Serial No. 685,059

8 Claims. (Cl. 103—87)

This invention relates to electric pump motors and refers more particularly to a glandless motor and pump unit comprising a centrifugal pump and an electric motor drivingly coupled to the pump and having its interior communicated with the interior of the pump so that fluid being pumped may be circulated through the motor to cool the same; and this application is a continuation-in-part of the copending application Serial No. 572,416, filed March 19, 1956, now abandoned.

The present invention has for its object the provision of an electric motor driven pump unit of the glandless type wherein the rotor of the motor operates in a hermetically sealed chamber which, however, communicates with the interior of a pump housing so that the fluid being pumped may flow into and out of said chamber, to cool the motor, and in which provision is made for cooling this fluid as it enters the motor.

Another object of this invention resides in the provision of a motor and pump unit of the character described wherein the impeller of the pump is driven by one squirrel cage rotor while another separate squirrel cage rotor drives a fan for circulating cooling air through the unit, but wherein both of said squirrel cage rotors operate within the fields generated by a single stator winding.

It is another object of this invention to provide an electrically driven pump unit in which the electric motor has a fluid chamber through which fluid being pumped may circulate and a fan compartment endwise adjacent to and coaxial with said fluid chamber, and in which is housed a fan for circulating cooling air through the unit, said fluid chamber being separated from the fan compartment by a transverse partition, and wherein said fan and pump are driven by separate and unconnected squirrel cage rotors which, however, rotate in a common stator.

In connection with the foregoing stated object, it is a further object of this invention to provide a unit of the character described wherein the shafts for the fan and the main motor are journaled in bearings carried directly by the motor housing, and wherein the partition between the squirrel cage rotors, separating the fan compartment from the fluid chamber, is not called upon to carry any of the stresses or loads which might be imposed upon either rotor shaft, thus assuring that said partition will maintain a good seal between the fan compartment and the fluid chamber.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 2 is a fragmentary longitudinal sectional view of a modified embodiment of the motor driven pump of this invention;

Figure 3 is a fragmentary longitudinal sectional view taken through the pump and showing another modification of this invention; and Figure 4 is a view partly in side elevation and partly in longitudinal section, illustrating still another embodiment of this invention.

Figure 1:
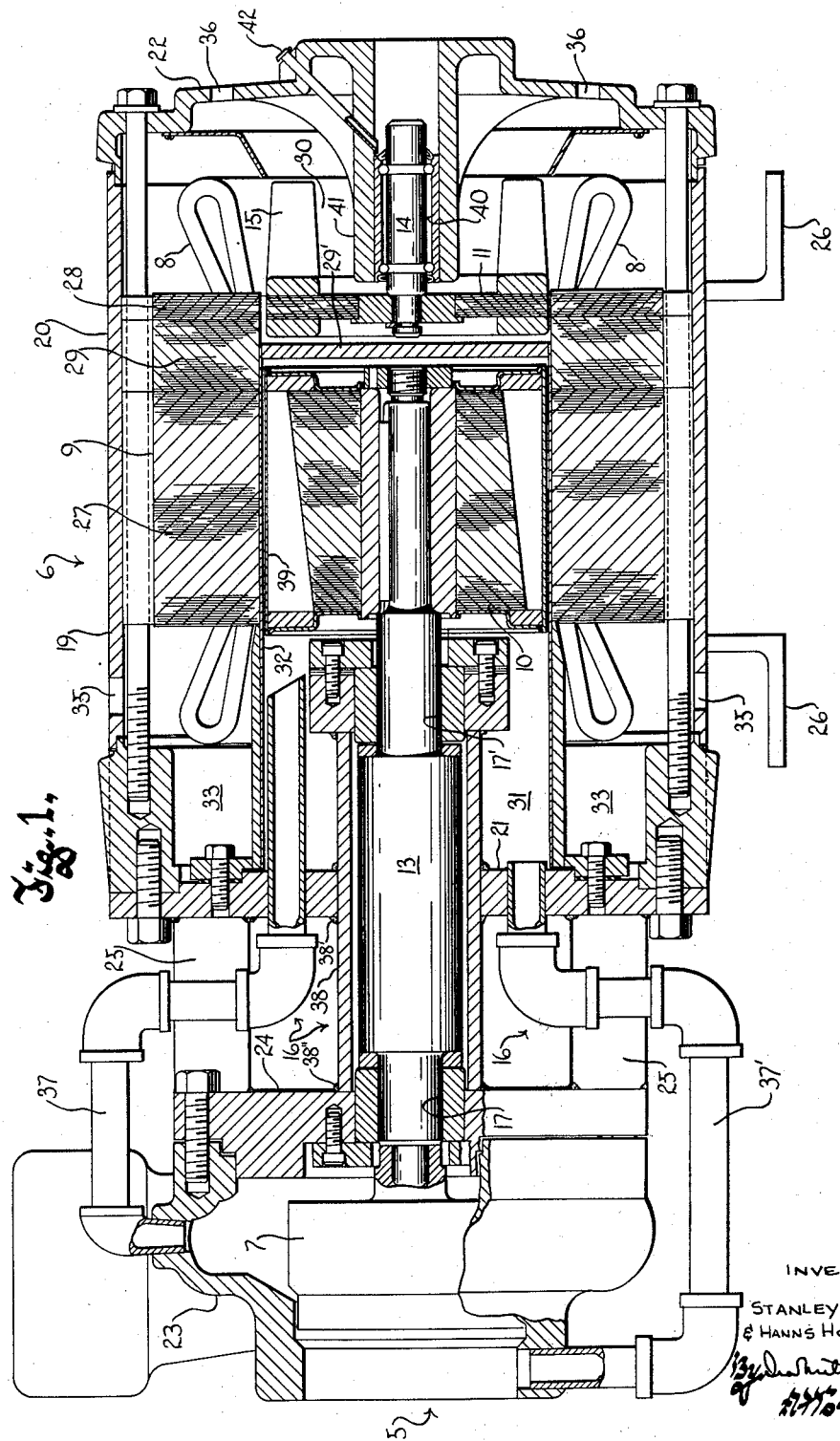
Figure 1 is a view partly in side elevation and partly in longitudinal section showing an electric motor driven pump unit embodying the principles of this invention.

Referring now more particularly to the accompanying drawings, and specifically to Figure 1 thereof, the unit of this invention comprises, in general, a fluid pump of the centrifugal type designated generally by the numeral 5, and an electric motor designated generally by the numeral 6 for driving the rotor or impeller 7 of the pump. The electric motor is of the type which is adapted to have the winding 8 of its stator 9 energized by alternating current, and, in this case, a pair of squirrel cage rotors 10 and 11 are coaxially mounted in the stator. The larger squirrel cage rotor 10 is drivingly coupled with the pump impeller 7 by means of a main shaft 13, while the smaller squirrel cage rotor is mounted on a separate stub shaft 14 and carries a fan 15 by which cooling air is forced through the motor.

The interiors of the motor and of the pump are communicated with one another by duct means designated generally by the numeral 16 whereby fluid being pumped is enabled to circulate through the interior of the motor to cool the same and to lubricate bearings 17, 17' in which the main shaft 13 is journaled, it being understood that the bearings permit the fluid to flow therethrough.

The motor comprises a housing 19 having a substantially cylindrical side wall 20 and complementary opposite end walls 21, 22. The pump also has a housing 23 with an end wall 24 which is held coaxial with and spaced from the adjacent end wall 21 of the motor by means including a plurality of spacers 25 which are welded or otherwise secured to said end walls and by which the pump is thus coaxially mounted on the driving motor. Suitable feet 26 on the bottom of the motor housing provide for mounting of the entire unit.

Enclosed in the motor housing, spaced from both ends thereof, is the wound stator 9, which in this case comprises two groups 27, 28 of magnetically permeable laminations separated from one another by a spacer 29 of nonmagnetic material interposed between them. The spacer is preferably formed from laminations of nonmagnetic material cut on the same die as the magnetic laminations to permit the stator to be wound in the same manner that a conventional stator would be, with all of the coils of the winding 8 embracing the entire bank of laminations, magnetic and nonmagnetic, and thus the winding is common to both groups of magnetic laminations. The presence of the nonmagnetic spacer brings about a reduction in both stray flux and reactance, and thus improves motor performance.

Extending transversely across the bore of the stator in radial alignment with the nonmagnetic laminations is a nonmagnetic partition 29', which separates a fan compartment 30 in the motor housing, at the end thereof remote from the pump, from a fluid chamber 31. The fluid chamber is conjointly defined by said partition 29', the end wall 21 of the housing adjacent the pump, and a cylindrical shell or liner 32 which projects into and closely overlies the inner surface of the annular stator laminations and extends from said partition to said end wall.

The liner 32 also cooperates with the cylindrical side wall of the motor housing and with the end wall 21 in defining an annular air chamber 33, extending axially from said end wall 21 to the adjacent end of the stator laminations and surrounding the fluid chamber 31. Air may enter the fan compartment 30 through inlet ports 36 in the adjacent end wall of the motor housing to be forced by the fan 15 across the stator coils and laminations and into the compartment 33 from which it is expelled through air outlets 35 in the motor housing side wall. It will be observed that air in the air chamber 33 and fluid in the fluid chamber 31 are in indirect heat exchange relationship with one another through the medium of the liner 32, and that consequently cooling air drawn through the stator may also serve to cool that portion of the fluid being pumped which circulates in the fluid chamber of the motor.

As it enters and leaves the interior of the motor, the fluid being pumped may also be cooled by reason of the fact that it must flow through the duct means 16, which spans the space between the end wall 24 of the pump and the adjacent end wall 21 of the motor and thus provide for indirect heat exchange between fluid flowing therethrough and the surrounding atmosphere. These duct means comprise a pipe 37 communicating the outlet of the pump with the fluid chamber and through which fluid being pumped is introduced into the interior of the motor, and another pipe 37' which communicates the interior of the motor with the inlet of the pump and thus provides for withdrawal of fluid from the interior of the motor. Hence, fluid circulates through the fluid chamber at a rate proportional to the pressure rise across the pump.

The duct means communicating the pump and motor also includes a tube 38 extending coaxially in opposite directions from the end wall 21 of the motor housing and secured therein with a fluid tight joint, as by a weld 38'. At its outer end the tube is similarly secured, as by a weld 38'', to the adjacent end wall 24 of the pump, and the spacers 25 thus cooperate with the tube in supporting the pump housing on the motor housing. The main shaft 13 which couples the main squirrel cage rotor 10 to the pump rotor has a large diameter portion extending through this tube, in radially spaced relation to its bore so as to facilitate the flow of fluid being pumped through the bearings 17, 17' in which reduced portions of the shaft are journaled.

The bearings, in this case shown as plain bushings (although they may be of any other suitable type) are mounted at the ends of the tube 38 adjacent to the shoulders at the junction of the reduced shaft journals with the larger diameter portion of the shaft inside the tube 38, and the shaft ends project beyond the bearings to have the pump rotor and main squirrel cage rotor secured thereto.

The end wall 21 of the motor housing adjacent the pump is spaced a substantial distance from the stator, so that the annular air chamber 33 and the fluid chamber 31 encircled thereby have substantial volume; and the tube 38 preferably projects a substantial distance inwardly of the motor housing end wall 21. The bearing 17 adjacent to the pump rotor is seated in a concentric bore in the motor carried end wall 24 of the pump housing, while the other bearing 17' is carried by the tube 38 at the inner end of the latter to provide adequate axial spacing between said bearings. It will thus be seen that both of the bearings 17, 17' are indirectly carried by the end wall 21 of the motor adjacent the pump.

The main squirrel cage rotor is located in the fluid chamber defined by the cylindrical liner 32, and to protect its laminations from possible corrosive action of the fluid being pumped it is enclosed in a sheath 39 which may be made of the same material as the liner 32, namely, stainless steel or the like.

The outer portion of the stub shaft 14 for the fan rotor is journaled in axially spaced bearings 40 in the bore of a boss 41 in the end wall 22 of the motor housing remote from the pump, and the fan rotor is carried on the inwardly projecting unsupported end portion of the stub shaft.

Since the stub shaft 14 is not working in the fluid being pumped, provision must be made for lubrication thereof from an external supply, as by means of an oiler 42, or its bearings may be of the sealed type not requiring external lubrication.

It will be seen that both shafts 13 and 14 are unsupported at their ends adjacent to the partition 29'; and since the partition carries no bearings, it is not subjected to any of the loads or stresses imposed upon the shafts and will, therefore, better maintain its seal with the liner 32, even though both the partition and liner are made of relatively light material. It will also be observed that the adjacent end walls of the pump and motor housings, together with their connecting tube, the shaft 13 extending therethrough, and the rotors, constitute a unitary subassembly.

The modified embodiment of the invention shown in Figure 2 differs from that hereinbefore described in that it does not include the external ducts which communicate the interior of the pump housing with the fluid chamber 31 in the motor housing, so that only a very limited amount of fluid is bled away from the pump for circulation through the interior of the motor housing. The adjacent end walls 21 and 24 of the motor housing and pump housing, respectively, are connected in spaced apart relationship by means of a tube 38, by which the pump is supported from the motor end wall and by which main rotor bearings 17, 17' are supported in axially spaced apart relationship, all as in the device of the Figure 1 embodiment. Also as in the embodiment shown in Figure 1, fluid subjected to the discharge pressure of the pump flows through the bearings 17, 17' (which may be provided with lengthwise extending grooves 44 to facilitate such lubricating flow) and through the annular space between the shaft 113 and the tube 38, to enter the fluid chamber 31 in the motor housing.

However, instead of returning through an outside duct, the shaft 113 is tubular, and fluid from the chamber 31 returns to the pump through the bore 113' which extends coaxially through the shaft.

To provide a metering restriction to the flow of fluid to and from the motor, the pump rotor or impeller 7 may be secured to the shaft by means of a cap-like nut 45 which engages over the end portion of the shaft within the pump housing and which has a restricted coaxial orifice 46 therein. Different rates of flow can be provided for by replacing the nut 45 with other similar nuts having different sized orifices.

Alternatively, the rate at which fluid is permitted to be bled from the pump for flow through the motor may be adjustably regulated by means of a nut 45' of the modified type shown in Figure 3, wherein the nut cooperates with the end surface 47 of the shaft to provide such metering. The nut 45' is cap-like, but instead of a single coaxial metering orifice, it has a plurality of small circumferentially spaced axially extending bores 46' disposed in line with the end surface 47 of the shaft, so that the lengthwise position of adjustment of the nut relative to the shaft effects regulation of the rate of flow of fluid through the bores. Thin spacer washers 48 may be interposed between the nut and the pump impeller to provide for such positioning of the nut.

The structure illustrated in Figure 4, is a more commercially practicable embodiment of the invention, but in many respects the elements thereof are substantially identical with those shown and described in connection with the forms of the invention illustrated in Figures 1 and 2.

Accordingly, much of the preceding description applies to this embodiment of the invention and, to the extent that it does, the same reference numerals are used in Figures 1, 2 and 4.

Perhaps the greatest difference between the Figure 4 and Figure 1 embodiments of the invention—aside from the fact that in the Figure 4 construction the return for the cooling fluid is through a bore extending longitudinally through the shaft as in Figure 2—resides in the specific structure connecting the pump and motor. This structure comprises essentially a casting, designated generally by the numeral 50, and consisting of an inner tubular portion 51 and an outer tubular portion 52 connected at one end by a wall 53 and at the other end by a wall 54. The wall 53 serves as one end wall for the pump housing and, hence, corresponds to the wall 24 in Figure 1. A flange 55 encircling the outer tubular portion 52 adjacent to the end wall 53 provides the means by which the casting 50 is bolted to the pump housing. Another flange 56 provides for bolting the casting 50 to the adjacent end of the motor housing. The flange 56 may thus be considered the counterpart of the wall 21 in Figure 1.

However, in addition to providing the means by which the casting 50 is bolted to the motor housing, the flange 56 also serves as an anchor for the adjacent end of the cylinder 32 which is secured thereto be means of a ring 57 bolted to the flange 56 with a gasket 58 therebetween.

The main shaft, designated 213 in Figure 4, which carries the pump impeller 7 and also the main motor rotor 10, is journaled in bearings 217—217' mounted in the opposite ends of the tubular portion 51 of the casting 50. These bearings are adapted to be lubricated by the liquid or fluid being pumped and are so constructed that the liquid or fluid may pass axially therethrough. Accordingly, the tubular portion 51 of the casting serves as a duct communicating the interior of the pump housing with the fluid chamber of the motor in the same way as this communication has been achieved in the previously described constructions.

Also, as in Figure 2, a bore 213' extending longitudinally through the main shaft provides a return passage for the cooling fluid which enters the motor housing and, more particularly, the fluid chamber therein, through the tubular portion 51.

Attention is directed to the fact that the bearings 217 and 217' are very nearly equispaced from the flange 56. This achieves a desirable balance in the structure and, as noted hereinbefore, locates the bearing 217' well within the motor housing and directly adjacent to the main motor rotor 10.

In the embodiment of the invention illustrated in Figure 1, and as also partially illustrated in Figure 2, the duct means through which the pump and motor interiors are communicated is directly exposed to the surrounding atmosphere, so that the temperature of the liquid or fluid flowing therethrough may be modified by the surrounding atmosphere.

In the Figure 4 embodiment of the invention, a more positive control of the temperature of the fluid flowing to the motor is achieved by virtue of the fact that the space between the inner and outer tubular portions 51 and 52 provides a jacket through which a temperature modifying fluid may be circulated as by ducts connected to inlet and outlet ports 59 and 60.

As can be readily appreciated, the casting 50 provides a rigid connection between the pump and motor so that normally no support for the pump per se need be provided. However, where occasion requires, a supporting foot 61 may be easily attached to the flange 55 to provide additional support for the pump.

From the foregoing description taken together with the accompanying drawings, it will be readily apparent that this invention provides a glandless motor and pump unit wherein the fluid being pumped is circulated through the interior of the motor to cool the same and lubricate its bearings and wherein such fluid is cooled both as it leaves and as it enters the motor, and is further cooled while in the motor by indirect heat exchange with air drawn through the motor housing and by which the motor stator is also directly cooled.

What is claimed as our invention is:

1. An electric motor and centrifugal pump unit comprising: individual coaxial motor and pump housings, said housings having end walls in opposing spaced apart relation; imperforate duct means rigidly connected to and spanning the distance between said end walls; means within the motor housing coacting with said end wall of the motor housing to define a fluid chamber to which said duct means opens, so that the duct means communicates the fluid chamber with the interior of the pump housing; a rotor for the motor inside said fluid chamber; an impeller for the pump inside the pump housing; a shaft common to said rotor and impeller, said shaft passing through the duct means in spaced relation to the wall thereof; bearing means for said shaft in said duct means so that fluid flowing through the duct means passes through the bearing means; and other duct means communicating said fluid chamber with the interior of the pump housing.

2. The electric motor and pump unit of claim 1 further characterized by the fact that said other duct means communicating the fluid chamber with the interior of the pump housing is a bore extending axially through the shaft.

3. In an electric motor and pump unit: means providing individual housings for the pump and the motor with one end wall of each housing opposing and spaced from an end wall of the other; a tube extending coaxially lengthwise between said opposing end walls and fixed to them with fluid tight joints, said tube mounting the pump housing on the motor housing in axially spaced relationship thereto; coaxial bearings at the ends of said tube, said bearings providing limited communication between the interiors of the motor and pump housings through the interior of the tube; a shaft rotatably journaled in said bearings and extending coaxially through the tube in spaced relation to the bore thereof, with its ends projecting into the motor and pump housings; an impeller in the pump housing fixed on the adjacent projecting end portion of the shaft; a rotor in the motor housing fixed on the other projecting end portion of the shaft; and duct means spanning the space between said end walls of the housings for respectively communicating the pump outlet and the pump inlet with the interior of the motor, to effect circulation of fluid from the pump through the interior of the motor.

4. The electric motor and pump unit of claim 3 further characterized by the fact that said tube has an end portion thereof projecting a substantial distance into the interior of the motor housing from said end wall thereof; and further characterized by the fact that one of said bearings is carried by said end portion of the tube so as to be located well within the motor housing.

5. The electric motor and pump unit of claim 3 further characterized by: means including a substantially thin shell cooperating with a portion of the motor housing to define an inner fluid chamber in the motor housing to which said duct means open, and an annular air chamber surrounding said inner chamber, said chambers being in heat exchange relationship to one another through said shell to provide for cooling of fluid from the pump circulated through said fluid chamber, by air circulated through said air chamber; means cooperating with another portion of the motor housing to define a fan compartment in the interior of the motor adjacent to the end of the motor remote from the pump and communicating with said air chamber; and fan means in said fan compartment for circulating air through said air chamber.

6. In an electric motor of the type which has a squirrel cage rotor drivingly coupled with the rotor of a pump and wherein the motor has a housing provided with a chamber communicated with the interior of the pump body and through which fluid being pumped may be circulated to cool the motor: opposite ends walls on the motor housing; spacer means secured to the exterior of one of the end walls of the motor housing and to one of the end walls of the pump body and mounting the pump body on the motor housing in spaced coaxial relation to said one end wall of the motor housing; a coaxial annular stator fixed in the motor housing intermediate the ends thereof; an imperforate partition extending across the stator bore intermediate its ends to define a fan compartment in the end portion of the motor housing remote from the pump; a cylindrical shell fixed in the stator bore and extending from the stator to said one end wall of the motor housing and cooperating with said one end wall, the stator and a side wall portion of the motor housing to define an outer annular air chamber and a fluid chamber radially inwardly thereof, which chambers are in indirect heat exchange relation to one another through the wall of the shell; duct means spanning the space between the pump body and said one end wall of the motor housing and communicating the interior of the pump body with said fluid chamber in the motor, said duct means comprising a tube projecting coaxially into the motor housing through said one end wall thereof and fixed thereto; coaxial bearings at the ends of said tube; a shaft rotatably journaled in said bearings, one end portion of said shaft projecting through said end wall of the pump body and into the interior thereof and carrying the pump rotor, and the other end portion of the shaft projecting into the stator bore toward said partition and carrying a squirrel cage rotor, the portion of the shaft encircled by said tube having a diameter less than the inside diameter of the tube to permit fluid being pumped to flow between the interior of the pump and said fluid chamber, through the tube and said bearings; bearing means carried by the other end wall of the motor housing; a stub shaft journaled in said last designated bearing means and having an end portion projecting therefrom toward said partition and disposed in the stator bore; a second squirrel cage rotor on said projecting portion of the stub shaft, at the opposite side of the partition from said first designated squirrel cage rotor; and a fan in said fan compartment, carried by said second squirrel cage rotor, for circulating air through said annular air chamber and through the stator.

7. In an electric motor driven pump having a motor housing: an annular stator in the motor housing having two axially spaced apart groups of magnetically permeable laminations separated by nonmagnetic material; stator coils common to and embracing both of said groups of permeable laminations; a fixed nonmagnetic partition wall extending across the stator bore in alignment with and surrounded by said nonmagnetic material between the groups of permeable stator laminations; a tube coaxially fixed on one end wall of the motor housing with a fluid tight seal and projecting outwardly beyond said one end wall; coaxial bearings at opposite ends of the tube; a shaft journaled in said bearings, said shaft extending coaxially through the tube and projecting beyond both ends thereof, a pump housing having an end wall fixed on the outer end of the tube with a fluid tight seal and held by the tube in spaced opposing relation to said one end wall of the motor housing; a pump rotor fixed on the portion of said shaft projecting beyond the outer end of said tube, in the pump housing; a squirrel-cage rotor mounted on the other projecting portion of said shaft, inside the group of permeable stator laminations nearest the pump and at one side of said partition; bearing means carried by the end wall of the motor housing remote from the pump housing and coaxial with said shaft; another shaft journaled in said bearing means and having a portion projecting therefrom toward said partition wall; a second squirrel cage rotor mounted on said projecting portion of said other shaft, at the side of said partition remote from the first designated squirrel cage rotor; and fan means carried by said second squirrel cage rotor.

8. The electric motor driven pump of claim 7 further characterized by a substantially thin cylindrical shell overlying the inner surface of the stator laminations and extending from said partition wall to said one end wall of the motor housing to define a fluid chamber in the motor housing and an annular air chamber surrounding said fluid chamber and communicating with said fan compartment, said fan compartment and said fluid chamber being separated by said partition wall and said fluid chamber and said air chamber being in heat exchange relationship to one another through said shell.

References Cited in the file of this patent

UNITED STATES PATENTS

| | | |
|---|---|---|
| 2,478,706 | Peters | Aug. 9, 1949 |
| 2,542,896 | Brady | Feb. 20, 1951 |
| 2,669,187 | Guyer | Feb. 16, 1954 |

FOREIGN PATENTS

| | | |
|---|---|---|
| 157,495 | Austria | Nov. 25, 1939 |